(12) United States Patent
Song

(10) Patent No.: US 10,520,726 B2
(45) Date of Patent: Dec. 31, 2019

(54) HEAD-UP DISPLAY (HUD) APPARATUS FOR VEHICLE

(71) Applicant: HYUNDAI MOBIS Co., Ltd., Seoul (KR)

(72) Inventor: Ki Hyuk Song, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/996,553

(22) Filed: Jun. 4, 2018

(65) Prior Publication Data

US 2018/0356633 A1 Dec. 13, 2018

(30) Foreign Application Priority Data

Jun. 8, 2017 (KR) ........................ 10-2017-0071517

(51) Int. Cl.
*G02B 27/01* (2006.01)
*B60K 35/00* (2006.01)
*G02B 19/00* (2006.01)
*G09G 3/00* (2006.01)

(52) U.S. Cl.
CPC .......... *G02B 27/0101* (2013.01); *B60K 35/00* (2013.01); *G02B 19/0009* (2013.01); *G02B 19/0066* (2013.01); *B60K 2370/33* (2019.05); *B60K 2370/334* (2019.05); *G02B 2027/0118* (2013.01); *G09G 3/002* (2013.01); *G09G 2380/10* (2013.01)

(58) Field of Classification Search
CPC ................ B60K 35/00; B60K 2370/23; B60K 2370/1529; B60K 2370/33; B60K 2370/334; G02B 27/0101; G02B 19/0009; G02B 19/0066; G02B 2027/0118; G09G 2380/10; G09G 3/002
See application file for complete search history.

(56) References Cited

U.S. PATENT DOCUMENTS

| | | | | |
|---|---|---|---|---|
| 5,757,544 A | * | 5/1998 | Tabata | G02B 27/0081 359/385 |
| 6,870,650 B2 | * | 3/2005 | Kappel | A61C 1/0061 348/E5.141 |
| 2016/0147074 A1 | * | 5/2016 | Kobayashi | G02B 3/0006 345/7 |
| 2017/0299922 A1 | * | 10/2017 | Matsuura | B60K 35/00 |

* cited by examiner

*Primary Examiner* — Muhammad N Edun
(74) *Attorney, Agent, or Firm* — H.C. Park & Associates, PLC

(57) ABSTRACT

A head-up display (HUD) apparatus for a vehicle, including: a light source unit configured to irradiate light; an image forming unit configured to form an image using the light generated through the light source unit; a condensing lens unit installed between the light source unit and the image forming unit, and configured to condense the light irradiated from the light source unit toward the image forming unit; a parallel lens unit installed between the condensing lens unit and the image forming unit, and configured to guide the light having passed through the condensing lens unit such that the light is irradiated in parallel toward the image forming unit; and a field lens unit installed between the parallel lens unit and the image forming unit, and forming a concave lens toward the image forming unit.

10 Claims, 6 Drawing Sheets

HEAD-UP DISPLAY (HUD) APPARATUS FOR VEHICLE

CROSS-REFERENCES TO RELATED APPLICATION

This application claims priority from and the benefit of Korean Patent Application No. 10-2017-0071517, filed on Jun. 8, 2017, which is hereby incorporated by reference for all purposes as if set forth herein.

BACKGROUND

Field

Exemplary embodiments relate to a head-up display (HUD) apparatus for a vehicle, and more particularly, to an HUD apparatus for a vehicle, which can provide a high-brightness virtual image to secure a driver's visibility.

Discussion of the Background

HUD represents a system which displays various pieces of vehicle information as virtual images on the windshield glass of a vehicle, such that a driver can check the vehicle information while keeping eyes forward during driving.

A light source unit for generating an image in the HUD includes a light source element such as an LED, a lens for condensing a light source, a diffusion film for securing the uniformity of lighting, and an image forming element such as an LCD for forming an image.

In the conventional HUD, a separate lens is installed between the light source unit and an aspheric mirror, in order to improve the visibility of a virtual image by compensating for an image projection angle in the horizontal direction. However, since the conventional HUD does not provide a high-brightness virtual image, the visibility of a driver may be degraded. Furthermore, since external light is reflected by the lens and recognized by the driver, the visibility of driver may be degraded.

The above information disclosed in this Background section is only for enhancement of understanding of the background of the invention and, therefore, it may contain information that does not constitute prior art.

SUMMARY

Exemplary embodiments of the present invention provide an HUD apparatus for a vehicle, which can provide a high-brightness virtual image to secure a driver's visibility.

Additional features of the invention will be set forth in the description which follows, and in part will be apparent from the description, or may be learned by practice of the invention.

An exemplary embodiment of the present invention discloses an HUD apparatus for a vehicle including: a light source unit configured to irradiate light; an image forming unit configured to form an image using the light generated through the light source unit; a condensing lens unit installed between the light source unit and the image forming unit, and configured to condense the light irradiated from the light source unit toward the image forming unit; a parallel lens unit installed between the condensing lens unit and the image forming unit, and configured to guide the light having passed through the condensing lens unit such that the light is irradiated in parallel toward the image forming unit; and a field lens unit installed between the parallel lens unit and the image forming unit, and forming a concave lens toward the image forming unit.

The parallel lens unit and the field lens unit may be formed as one body.

The condensing lens unit may include: a base member installed at a position facing the light source unit, and formed of a light transmitting material; and condensing lenses protruding from the base member toward the parallel lens unit.

The light source unit may include: a substrate formed in a plate shape; and a plurality of light source elements installed on the substrate.

The number of the condensing lenses installed on the base member may correspond to the number of the light source elements.

The parallel lens unit may include: a plate-shaped support member integrated with the field lens unit, and formed of a light transmitting material; and protruding lenses protruding from the support member toward the condensing lens unit.

The field lens unit may include: a concave lens part integrated with the support member, and forming a concave lens toward the image forming unit; and a microlens part having a plurality of lenses formed on the surface of the concave lens part.

The concave lens part may have lateral and longitudinal radiuses set to different values.

The microlens part may be formed in a convex or concave shape on the concave lens part.

The microlens part may protrude in a hemispherical shape or rounded bar shape on the surface of the concave lens part facing the image forming unit.

The HUD apparatus may further include a diffusion unit positioned between the field lens unit and the image forming unit, and configured to guide diffusion of the light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
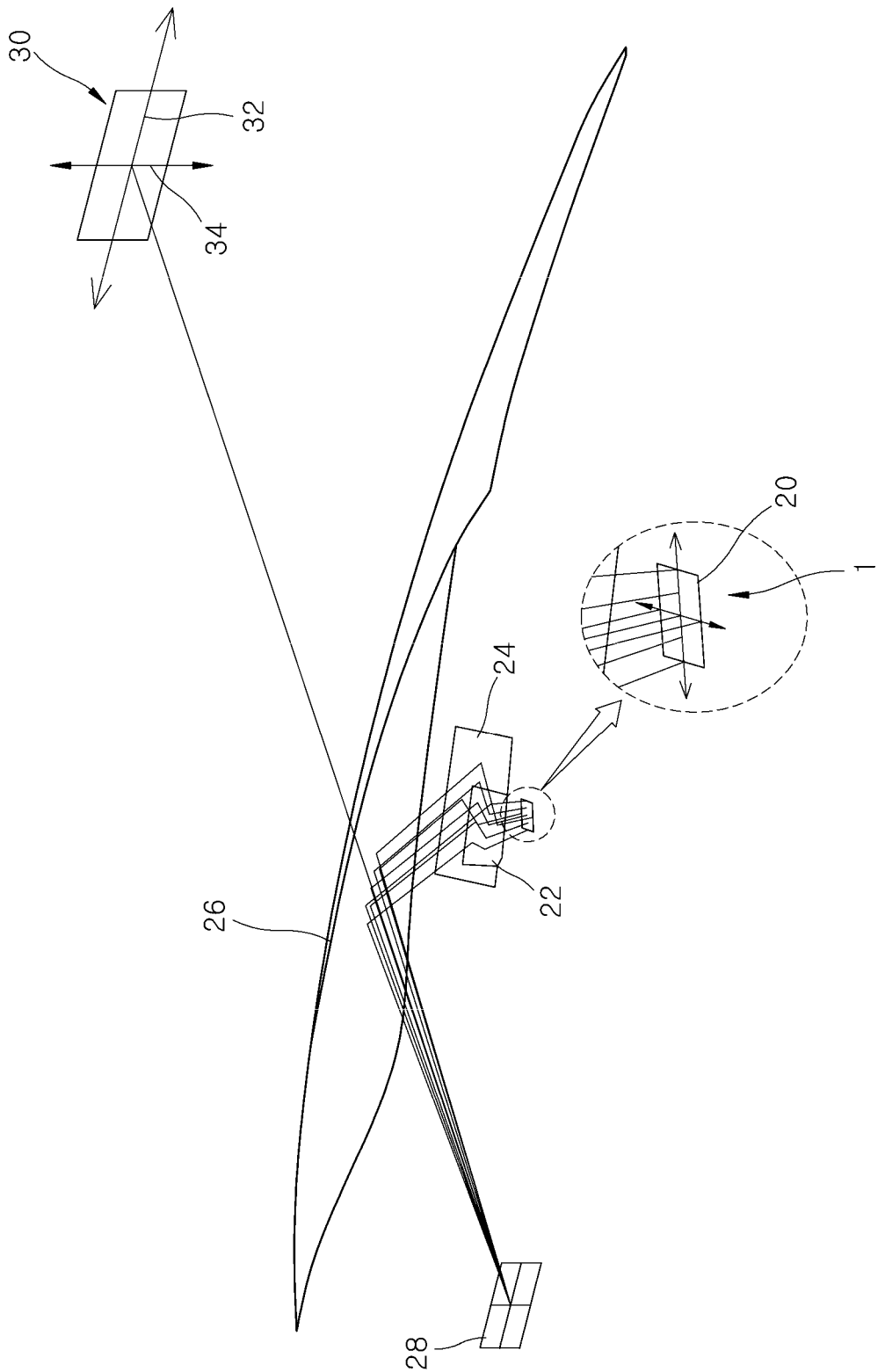
FIG. 1 schematically illustrates that an HUD apparatus in accordance with an embodiment of the present invention is installed.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Furthermore, the terms as used herein are defined by taking functions of the invention into account and can be changed according to the custom or intention of users or operators. Therefore, definition of the terms should be made according to the overall disclosures set forth herein.

Figure 2:
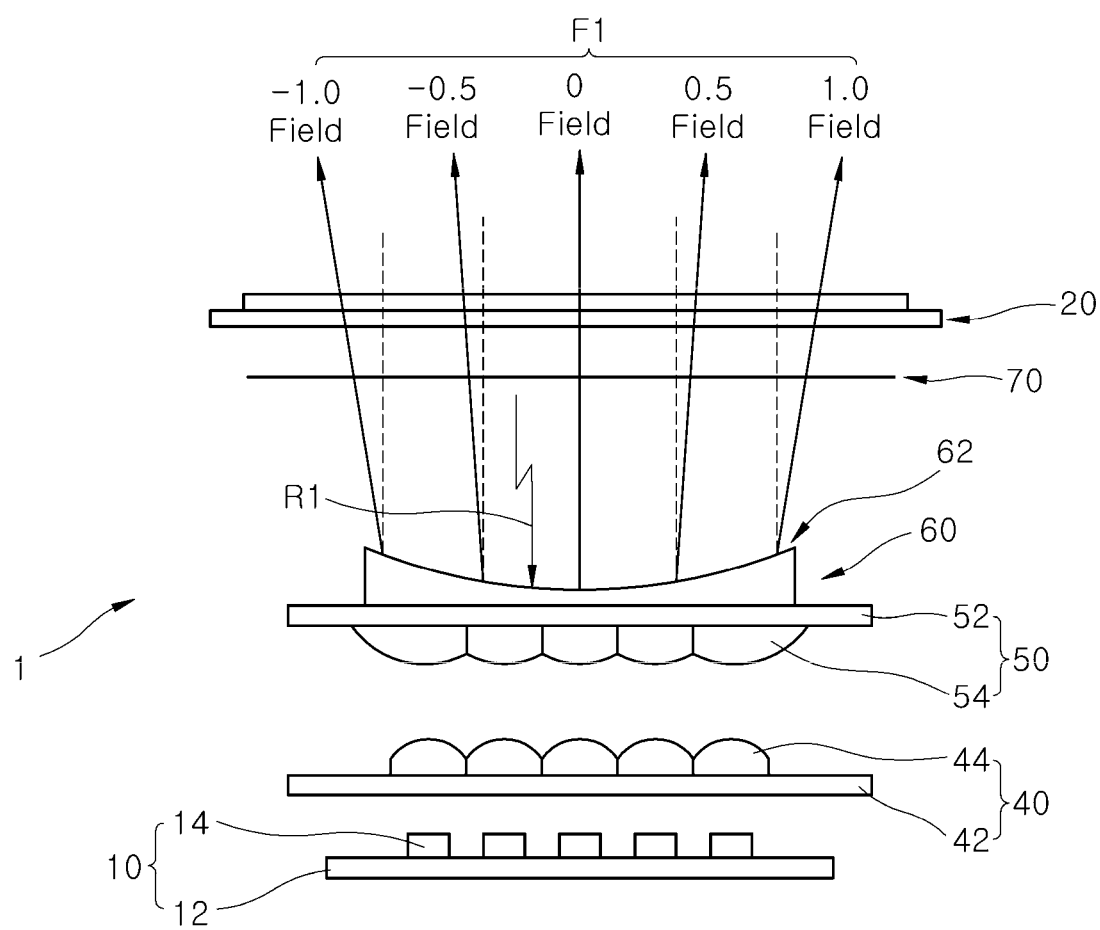
FIG. 2 is a front view of the HUD apparatus in accordance with the embodiment of the present invention.
Figure 3:
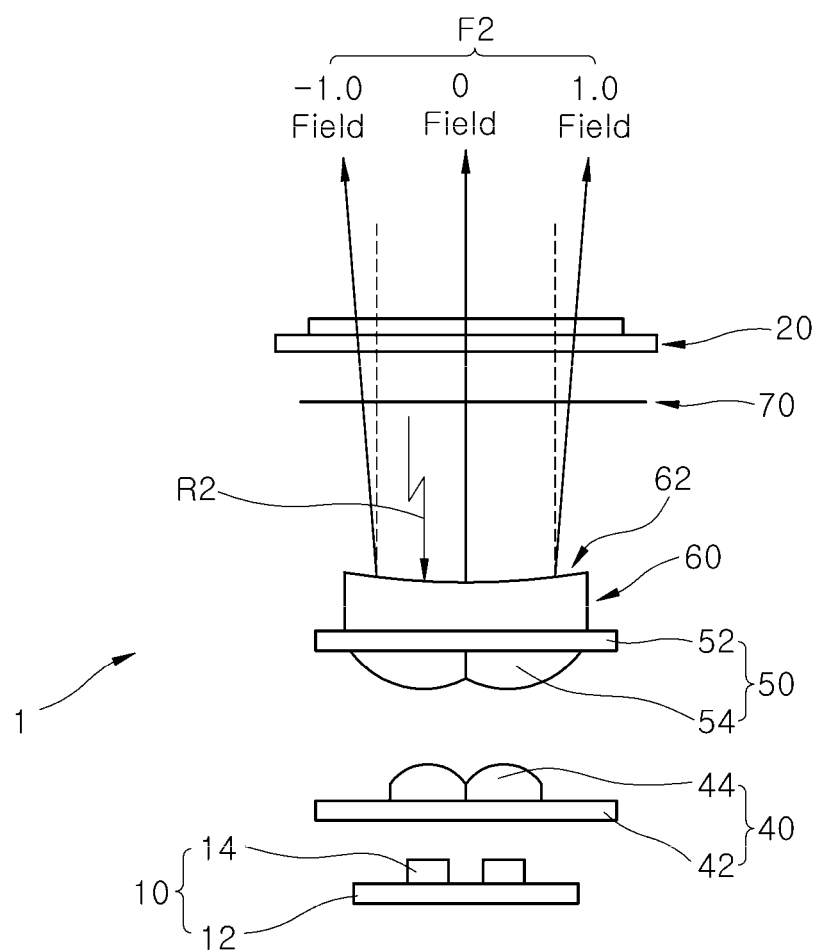
FIG. 3 is a side view of the HUD apparatus in accordance with the embodiment of the present invention.
Figure 4:
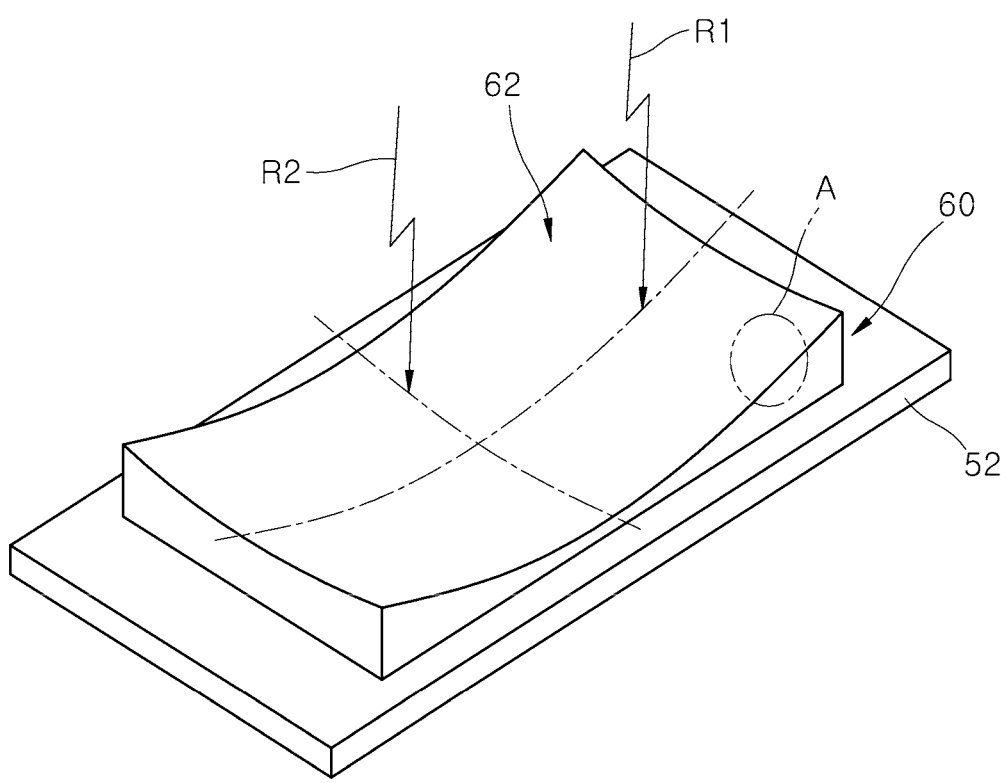
FIG. 4 is a perspective view illustrating a field lens unit in accordance with the embodiment of the present invention.
Figure 5:
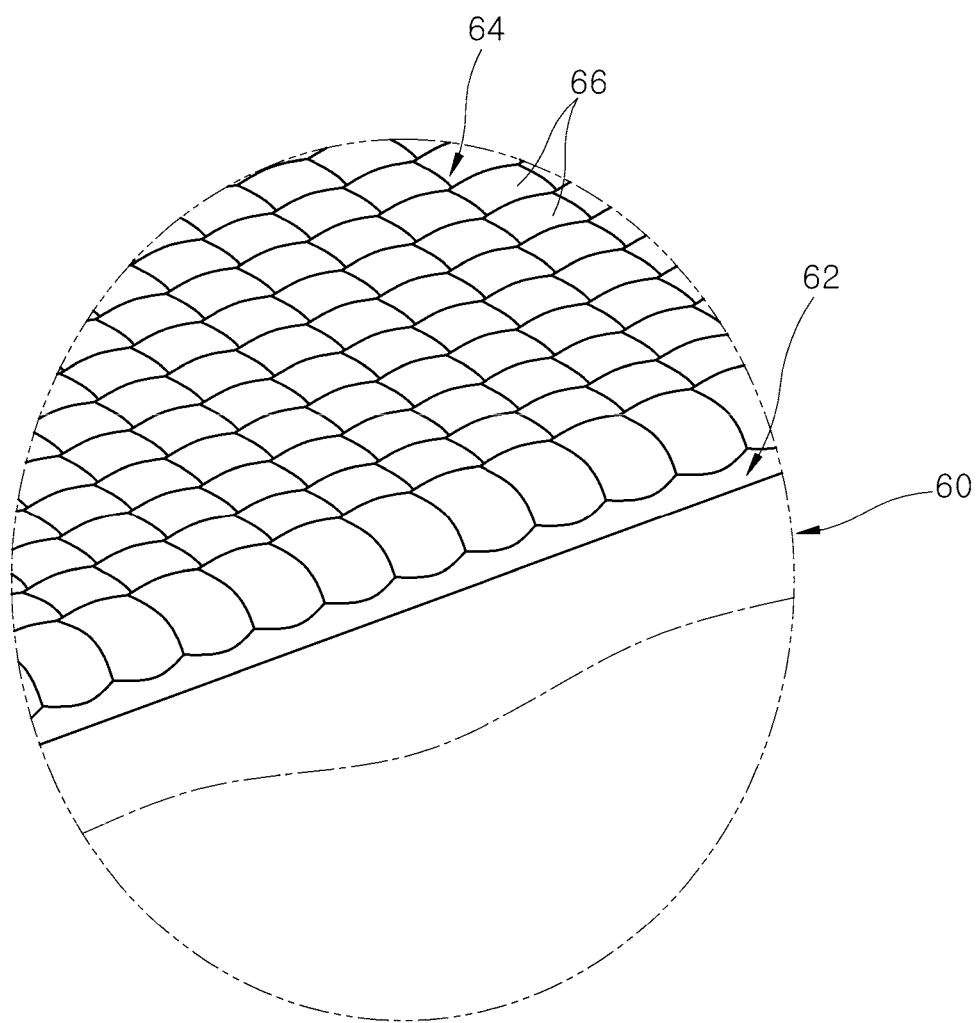
FIG. 5 is an expanded perspective view of a portion A of a concave lens part in accordance with the embodiment of the present invention, illustrating that first lenses are formed.
Figure 6:
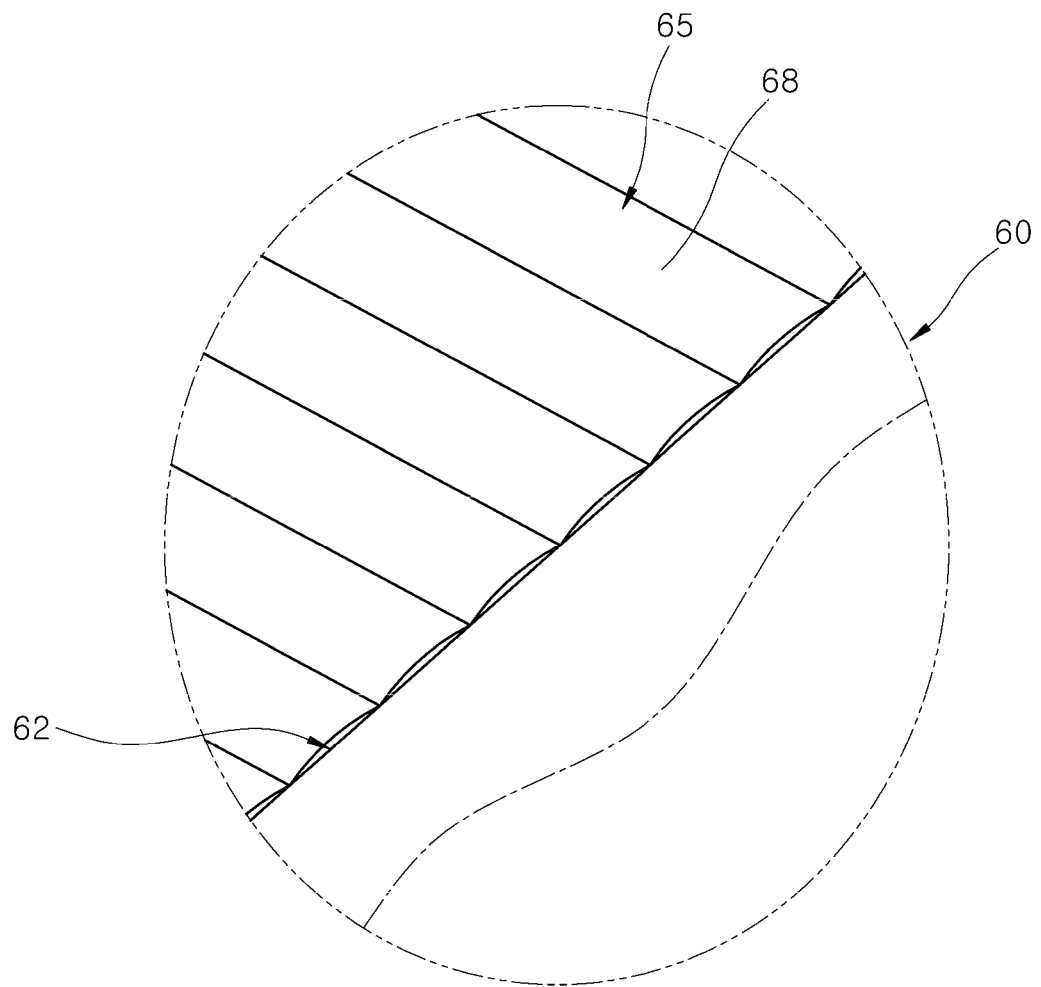
FIG. 6 is an expanded perspective view of the portion A of the concave lens part in accordance with the embodiment of the present invention, illustrating that second lenses are formed.

FIG. 1 schematically illustrates that an HUD apparatus in accordance with an embodiment of the present invention is installed, FIG. 2 is a front view of the HUD apparatus in accordance with the embodiment of the present invention, FIG. 3 is a side view of the HUD apparatus in accordance with the embodiment of the present invention, FIG. 4 is a perspective view illustrating a field lens unit in accordance with the embodiment of the present invention, FIG. 5 is an expanded perspective view of a portion A of a concave lens part in accordance with the embodiment of the present invention, illustrating that first lenses are formed, and FIG. 6 is an expanded perspective view of the portion A of the concave lens part in accordance with the embodiment of the present invention, illustrating that second lenses are formed.

As illustrated in FIGS. 1 to 3, the HUD apparatus 1 in accordance with the embodiment of the present invention may include a light source unit 10, an image forming unit 20, a condensing lens unit 40, a parallel lens unit 50 and a field lens unit 60. The light source unit 10 may irradiate light, the image forming unit 20 may form an image using the light generated through the light source unit 10, the condensing lens unit 40 may be installed between the light source unit 10 and the image forming unit 20, and condense the light irradiated from the light source unit 10 toward the image forming unit 20, the parallel lens unit 50 may be installed between the condensing lens unit 40 and the image forming unit 20, and guide the light passing through the condensing lens unit 40 such that the light is irradiated in parallel toward the image forming unit 20, and the field lens unit 60 may be positioned between the parallel lens unit 50 and the image forming unit 20, and form a concave lens toward the image forming unit 20.

The HUD apparatus 1 may be mounted in the vehicle, and project an image from the light source unit 10 onto the windshield glass 26 of the vehicle or a separate projection member, such that a driver can recognize a virtual image 30 in front.

The light source unit 10 may include various types of light sources, as long as the light sources can generate light using electrical energy and irradiate the light toward the image forming unit. The light source unit 10 in accordance with the present embodiment may include a substrate 12 and a plurality of light source elements 14.

The substrate 12 may be formed in a plate shape, and the plurality of light source elements 14 may be installed on the substrate 12 so as to generate light. In the present embodiment, an LED may be used as the light source element 14.

The image forming unit 20 may form an image using the light generated by the light source unit 10. The image forming unit 20 in accordance with the present embodiment may include an LCD having an image forming element for forming an image.

The image formed by the image forming unit 20 may be projected onto the windshield glass 26 of the vehicle through a folding mirror 22 and an aspheric mirror 24. The image projected onto the windshield glass 26 of the vehicle may be recognized through an eye-box 28 at which the driver's eyes are positioned. Therefore, since the image projected onto the windshield glass 26 forms a virtual image 30 at the front of the windshield glass 26, the driver can easily recognize the image of the virtual image 30.

In the HUD apparatus 1 in accordance with the embodiment of the present invention, the image forming unit 20 may be set to an object, the eye-box 28 may be set to a stop, the virtual image 30 may be set to an image, and the functions and shapes of the respective units may be adjusted so that the virtual image 30 can be clearly recognized at the eye-box 28.

In the virtual image 30, a lateral virtual line may be set to a first virtual line 32, and a longitudinal virtual line may be set to a second virtual line 34. The first and second virtual lines 32 and 34 may form a right angle.

The condensing lens unit 40 may be installed between the light source unit 10 and the image forming unit 20, and formed in various shapes as long as the condensing lens unit 40 can condense light irradiated from the light source unit 10 toward the image forming unit 20. The condensing lens unit 40 in accordance with the present embodiment may include a base member 42 and a plurality of condensing lenses 44.

The base member 42 may be installed at a position facing the light source unit 10, and include a plate-shaped member formed of a light transmitting material. The plurality of condensing lenses 44 may protrude from the base member 42 toward the parallel lens unit 50.

The light source unit 10 in accordance with the present embodiment may include the plurality of light source elements 14, and the number of the condensing lenses 44 may correspond to the number of the light source elements 14. Since the condensing lenses 44 are installed over the respective light source elements 14, light irradiated upward from the light source elements 14 may be condensed through the condensing lenses 44 and transferred to the parallel lens unit 50 positioned over the condensing lenses 44, which makes it possible to minimize a loss of the light while improving the brightness of the virtual image 30.

The parallel lens unit 50 may be installed between the condensing lens unit 40 and the image forming unit 20, and include various types of lenses as long as the lenses can guide light in parallel toward the image forming unit 20, the light having passed through the condensing lens unit 40. The parallel lens unit 50 in accordance with the present embodiment may include a plate-shaped support member 52 and a plurality of protruding lenses 54. The plate-shaped support member 52 may be integrated with the field lens unit 60 and formed of a light transmitting material, and the protruding lenses 54 may protrude in a convex shape from the support member 52 toward the condensing lens unit 40.

The condensing lenses 44 for condensing light generated from the light source elements 14 and the protruding lenses 54 for generating parallel light may form pairs while facing each other. The lateral and longitudinal arrangements of the light source elements 14, the condensing lenses 44, and the protruding lenses 54 may be set according to the size of the image forming unit 20.

The plurality of protruding lenses 54 protruding downward from the support member 52 may be positioned above the condensing lenses 44, and arranged according to first and second regions F1 and F2 which are horizontal and vertical regions of the image forming unit 20.

The field lens unit 60 may be installed on the opposite side of the parallel lens unit 50, and adjust the angle of the light irradiated toward the image forming unit 20. The field lens unit 60 may be installed between the parallel lens unit 50 and the image forming unit 20, and formed in various shapes as long as the field lens unit 60 can form a concave lens toward the image forming unit 20. Since the field lens unit 60 is injection-molded together with the parallel lens unit 50, the full length of the HUD apparatus 1 can be shortened, and the mold cost can be reduced.

Since the field lens unit 60 is integrated on the opposite side of the parallel lens unit 50, the field lens unit 60 and the parallel lens unit 50 may constitute one compound lens. In order to differently set the lateral and horizontal exit angles of light passing through the field lens unit 60, the lateral and longitudinal radiuses R1 and R2 of a concave lens part 62 may be set to different values. The field lens unit 60 in accordance with the present embodiment may include a concave lens part 62 and a microlens part 64 or 65.

The concave lens part 62 may be integrated with the support member 52, and form a concave lens toward the image forming unit 20. The lateral and longitudinal radiuses R1 and R2 of the concave lens part 62 may be set to different values. The lateral radius R1 of the concave lens part 62 may be related to the setting of the first virtual line 32 of the virtual image 30, and the longitudinal radius R2 may be related to the setting of the second virtual line 34.

The exit angle of the light having passed through the field lens unit 60 may be set in consideration of the first and second virtual lines 32 and 34 of the virtual image 30. When the light having passed through the field lens unit 60 is not diffused in a shape corresponding to the virtual image 30 including the first and second virtual lines 32 and 34, the uniformity of the virtual image 30 may be reduced to cause a local dark area, thereby having an influence on the image quality. For example, the brightness of the virtual image 30 may be lowered.

The HUD apparatus 1 in accordance with the embodiment of the present invention can widen the projection angle in the lateral and longitudinal directions, because the concave lens part 62 having different radiuses of curvature in the lateral and longitudinal directions is used.

The microlens part 64 or 65 in accordance with the present embodiment may include a plurality of microlenses formed on the surface of the concave lens part 62. The plurality of microlenses arranged on the surface of the concave lens part 62 may induce an additional diffusion of light. Since the lateral and longitudinal radiuses R1 and R2 of the concave lens part 62 are different from each other, the number of microlenses installed in the horizontal direction on the surface of the concave lens part 62 may be different from the number of microlenses installed in the vertical direction.

The microlens part 64 or 65 may be formed in a convex or concave shape on the surface of the concave lens part 62.

As illustrated in FIG. 5, the microlens part 64 may include first lenses formed on the surface of the concave lens part 62 facing the image forming unit 20, the first lenses protruding in a hemispherical shape. The first lenses 66 may protrude upward from the concave lens part 62, and have various shapes such as a hemispherical shape and rounded protrusion shape. The plurality of first lenses 66 may fill the upper space of the concave lens part.

Alternatively, as illustrated in FIG. 6, the microlens part 65 in accordance with another embodiment of the present invention may include bar-shaped rounded second lenses 68 formed on the surface of the concave lens part 62 facing the image forming unit 20. The plurality of second lenses 68 may be formed in a bar shape with a hemispherical cross-section, and successively laid and installed. The second lenses 68 may be installed in the widthwise direction of the concave lens part 62 (side-to-side direction in FIG. 3), and successively arranged along the longitudinal direction (side-to-side direction in FIG. 2) of the concave lens part 62.

As illustrated in FIGS. 4 to 6, the lenses of the microlens part 64 or 65 may be uniformly arranged along the surface of the field lens unit 60, based on the lateral radius R1 or the longitudinal radius R2. The plurality of lenses arranged in the microlens part 64 or 65 may have the same shape. If necessary, however, different shapes of lenses may be mixed and used.

Since the microlens part 64 or 65 is installed on the surface of the concave lens part 62, a uniform virtual image 30 can be acquired from the entire surface of the eye-box 28. The field lens unit 60 may include the concave lens part 62 and the microlens part 64 or 65, and the field lens unit 60 and the parallel lens unit 50 may be injection-molded together with each other. Therefore, since the lenses with various functions are manufactured as one body, the number of parts used for the lens can be reduced, which makes it possible to reduce the manufacturing cost while shortening the full length of the product.

As illustrated in FIGS. 2 and 3, the lateral radius R1 of the concave lens part 62 may be related to irradiation of the first region F1, and the longitudinal radius R2 of the concave lens part 62 may be related to irradiation of the second region F2. The first region F1 may be related to formation of the first virtual line 32 of the virtual image 30, and the second region F2 may be related to formation of the second virtual line 34 of the virtual image 30. Therefore, the lateral radius R1 and the longitudinal radius R2 of the concave lens part 62 may be adjusted to set the first and second regions F1 and F2, such that the first and second regions F1 and F2 coincide with the first and second virtual lines 32 and 34 of the virtual image 30.

The diffusion unit 70 may be positioned between the field lens unit 60 and the image forming unit 20, and guide diffusion of light. The installation of the diffusion unit 70 can secure the uniformity of light forming the virtual image 30. The driver may watch an expanded image of the image forming unit 20 through the folding mirror 22 and the aspheric mirror 24. The diffusion unit 70 installed between the field lens unit 60 and the image forming unit 20 may serve to prevent the microlens part 64 or 65 from being magnified and directly seen, the microlens part 64 or 65 being formed on the field lens unit 60.

The installation of the diffusion unit 70 can improve the brightness and uniformity of the virtual image 30 provided by the HUD apparatus 1.

The condensing lens unit 40, the parallel lens unit 50 and the field lens unit 60 may be formed of synthetic fiber or glass. The installation of the HUD apparatus 1 may not be limited only to a vehicle, but applied to various transportation modes such as an airplane, ship and train.

Hereafter, the operation of the HUD apparatus 1 for a vehicle in accordance with the embodiment of the present invention will be described in detail with reference to the accompanying drawings.

Since light generated from the light source elements 14 is condensed while passing through the condensing lens unit 40, the density of the light may be increased to raise the brightness of the virtual image 30, which makes it possible to improve visibility.

The light having passed through the condensing lens unit 40 may be guided as parallel light toward the image forming unit 20 through the parallel lens unit 50. The light passing through the field lens unit 60 integrated with the parallel lens unit 50 may be bent at a preset angle or moved in a straight direction, and moved to the image forming unit 20 through the diffusion unit 70. Since the microlens part 64 or 65 is installed on the entire surface of the concave lens part 62, a uniform virtual image 30 can be acquired without a shadow portion.

The light having passed through the image forming unit 20 may be irradiated onto the windshield glass 26 of the vehicle through the folding mirror 22 and the aspheric mirror 24. Therefore, the HUD apparatus 1 can secure the visibility of the driver by providing a high-brightness virtual image 30 even in a bright room environment, and improve the image quality by raising the uniformity of the virtual image 30.

In accordance with the embodiment of the present invention, the plurality of microlenses can be formed on the surface of the field lens unit 60, and induce an additional diffusion to provide a high-brightness virtual image 30, thereby securing a driver's visibility. Furthermore, since the light having passed through the microlens part 64 or 65 is diffused through the diffusion unit 70, the microlens part 64 or 65 can be prevented from being magnified and directly seen by the driver. Therefore, the brightness and uniformity of the virtual image 30 can be improved.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A head-up display (HUD) apparatus for a vehicle, comprising:
    a light source unit configured to irradiate light;
    an image forming unit configured to form an image using the light generated by the light source unit;
    a condensing lens unit installed between the light source unit and the image forming unit, and configured to condense the light irradiated from the light source unit toward the image forming unit;
    a parallel lens unit installed between the condensing lens unit and the image forming unit, and configured to guide the light having passed through the condensing lens unit such that the light is irradiated in parallel toward the image forming unit; and
    a field lens unit installed between the parallel lens unit and the image forming unit, and forming a concave lens toward the image forming unit,
    wherein the parallel lens unit and the field lens unit are formed as one body.

2. The HUD apparatus of claim 1, wherein the condensing lens unit comprises:
    a base member installed at a position facing the light source unit, and formed of a light transmitting material; and
    condensing lenses protruding from the base member toward the parallel lens unit.

3. The HUD apparatus of claim 2, wherein the light source unit comprises:
    a substrate formed in a plate shape; and
    a plurality of light source elements installed on the substrate.

4. The HUD apparatus of claim 3, wherein the number of the condensing lenses installed on the base member corresponds to the number of the light source elements.

5. The HUD apparatus of claim 1, wherein the parallel lens unit comprises:
    a plate-shaped support member integrated with the field lens unit, and formed of a light transmitting material; and
    protruding lenses protruding from the support member toward the condensing lens unit.

6. The HUD apparatus of claim 5, wherein the field lens unit comprises:
    a concave lens part integrated with the support member, and forming a concave lens toward the image forming unit; and
    a microlens part having a plurality of lenses formed on the surface of the concave lens part.

7. The HUD apparatus of claim 6, wherein the concave lens part has lateral and longitudinal radiuses set to different values.

8. The HUD apparatus of claim 7, wherein the microlens part has a convex or concave shape on the concave lens part.

9. The HUD apparatus of claim 7, wherein the microlens part protrudes in a hemispherical shape or rounded bar shape on the surface of the concave lens part facing the image forming unit.

10. The HUD apparatus of claim 1, further comprising a diffusion unit disposed between the field lens unit and the image forming unit, and configured to guide diffusion of the light.

* * * * *